(12) United States Patent
Chia

(10) Patent No.: US 9,745,121 B2
(45) Date of Patent: Aug. 29, 2017

(54) BEVERAGE FILTERING CARTRIDGE

(71) Applicant: Shuo-Chi Chia, Taichung (TW)

(72) Inventor: Shuo-Chi Chia, Taichung (TW)

(*) Notice: Subject to any disclaimer, the term of this patent is extended or adjusted under 35 U.S.C. 154(b) by 609 days.

(21) Appl. No.: 14/221,560

(22) Filed: Mar. 21, 2014

(65) Prior Publication Data

US 2014/0290494 A1  Oct. 2, 2014

(30) Foreign Application Priority Data

Apr. 1, 2013 (TW) .............. 102111646 A

(51) Int. Cl.
| | |
|---|---|
| *A47J 31/00* | (2006.01) |
| *B65D 85/804* | (2006.01) |
| *A47J 31/40* | (2006.01) |
| *A47J 31/06* | (2006.01) |
| *A47J 31/46* | (2006.01) |

(52) U.S. Cl.
CPC .......... *B65D 85/8043* (2013.01); *A47J 31/00* (2013.01); *A47J 31/40* (2013.01); *A47J 31/06* (2013.01); *A47J 31/46* (2013.01)

(58) Field of Classification Search
CPC ....... B65D 85/8043; A47J 31/06; A47J 31/40; A47J 31/46; A47J 31/00
USPC ............................ 99/295, 323, 304, 305, 307
See application file for complete search history.

(56) References Cited

U.S. PATENT DOCUMENTS

| | | | | |
|---|---|---|---|---|
| 7,815,953 B2* | 10/2010 | Mastropasqua | .... | B65D 85/8043 |
| | | | | 426/433 |
| 2006/0230944 A1* | 10/2006 | Neace, Jr. | ............... | A47J 31/16 |
| | | | | 99/279 |

FOREIGN PATENT DOCUMENTS

EP    1574452 A2    9/2005

* cited by examiner

*Primary Examiner* — Ghassem Alie
*Assistant Examiner* — Nhat Chieu Do
(74) *Attorney, Agent, or Firm* — McClure, Qualey & Rodack, LLP

(57) ABSTRACT

A beverage filtering cartridge for obtaining beverages, such as coffee, tea or the like, is provided. The beverage filtering cartridge includes an impermeable cup-shaped container, a filtering element, an impermeable cover and a removable instrument. The container has a first opening and a second opening which is smaller than the first opening. The first opening is sealed with the impermeable cover and the second opening is blocked by the removable instrument. The filtering element is located in the container so as to divide the container into two chambers. The tea or coffee will be located between the filtering element and the impermeable cover. When the consumer uses the cartridge by a machine, the consumer must remove the removable instrument and then put the cartridge into the machine. The machine injects water into the cartridge so as to quickly brew the drink, i.e. tea or coffee.

6 Claims, 8 Drawing Sheets

BEVERAGE FILTERING CARTRIDGE

BACKGROUND OF THE INVENTION

Field of the Invention

The present invention relates to a beverage filtering cartridge; especially, the invention relates to a single serve beverage filtering cartridge for making drinks.

Description of the Related Art

European Publication Patent EP1574452(A2) discloses a conventional beverage filtering cartridge. However, the conventional cartridge must include a means having protrusions and a film over the protrusions. When a user makes drinks by using the conventional cartridge, the beverage brewing system will inject water into the cartridge with high pressure and press the film. Thus, the protrusions will penetrate the film so that the water will further go through the film. Please understand that the numbers cited above should be referred to the symbols cited in EP1574452(A2). However, the conventional cartridge is not compatible with the brewing system with low water pressure, such as Keurig's machine.

BRIEF SUMMARY OF THE INVENTION

The object of the present invention is to provide a single serve beverage filtering cartridge which is compatible with the brewing system with high water pressure, as well as the brewing system with low water pressure. Thus, the present invention can easily make drinks by injecting the liquid into the single serve beverage filtering cartridge and then reducing or dissolving the substance inside the cartridge to a drink.

According to the object of the invention, the beverage filtering cartridge includes a cup-shaped body, a filtering element, an impermeable cover and a removable means. The cup-shaped body has a first opening and a second opening, and the first opening is larger than the second opening. The impermeable cover covers and seals the first opening, and the second opening is blocked with removable means. The filtering element is located in the cup-shaped body, so that a storage space inside the cup-shaped body is formed between the impermeable cover and the filtering element; wherein the storage space could store and preserve the substance that could be reduced to a drink. When a user makes a drink by using the beverage filtering cartridge, the brewing system injects liquid into the cartridge and then dissolves or reduces the substance inside the cartridge to a drink. The drink will flow out of the beverage filtering cartridge through the second opening.

According to the object of the invention, the beverage filtering cartridge further comprises a bag enclosing a substance which could be reduced or dissolved to a drink. The bag is located between the impermeable cover and the filtering element.

According to the object of the invention, one of the features of the present invention is that the filtering element is fixed in the cup-shaped body.

According to the object of the invention, another feature of the present invention is that the filtering element has a plurality of meshes.

According to the object of the invention, another feature of the present invention is that the center of first opening and the center of the second opening form a first axis, so the second opening has a side wall which extends from the cup-shaped body and surrounding the first axis so as to form a tunnel.

According to the object of the invention, another feature of the present invention is that the removable means is a plug or cylindrical cover which seals the second opening.

An advantage of the invention is that the beverage filtering cartridge can quickly reduce or dissolve the substance inside the cartridge to a drink.

Another advantage of the invention is that the beverage filtering cartridge can preserve the substance inside the cartridge from damp or deterioration.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A description is given below, with reference to the FIG. 1 through FIG. 5 of embodiment of the present invention.

Figure 1:
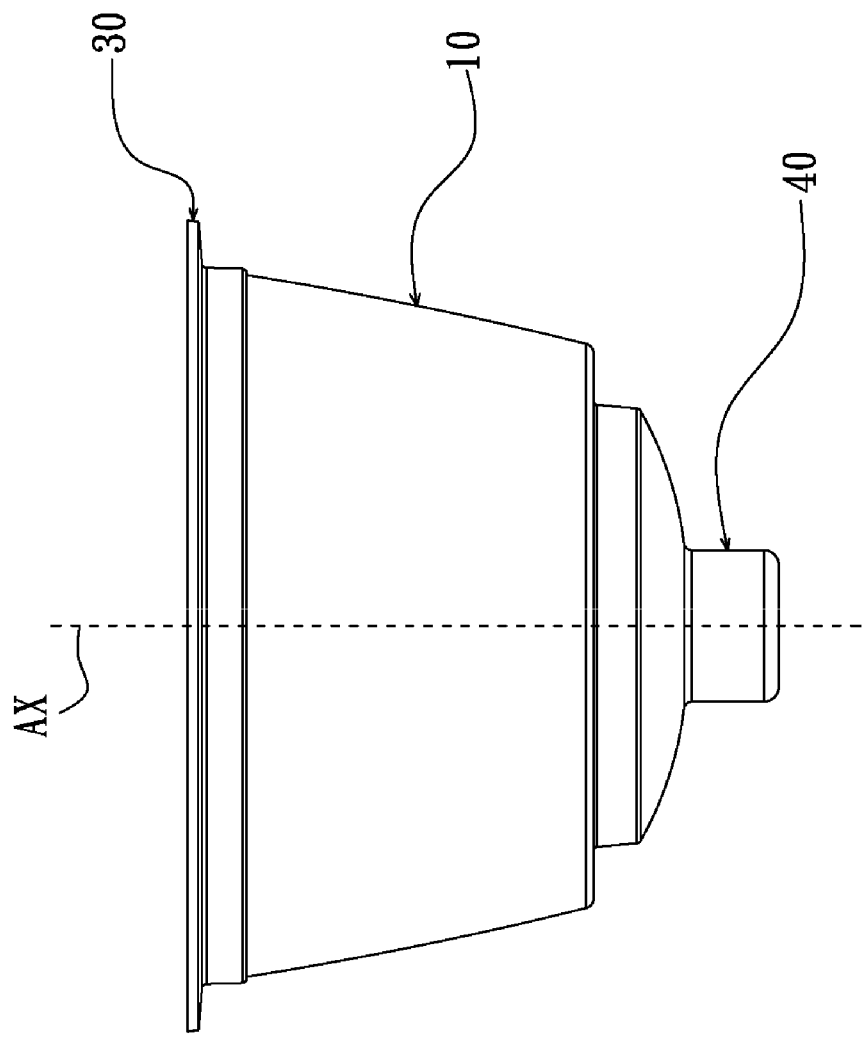
FIG. 1 is a lateral view showing a beverage filtering cartridge of the present invention.

FIG. 1 is a lateral view showing a beverage filtering cartridge of the present invention. As shown in FIG. 1, the beverage filtering cartridge 100 includes a cup-shaped body 10, a filtering element (not shown), an impermeable cover 30 and a removable means 40.

Figure 2A:
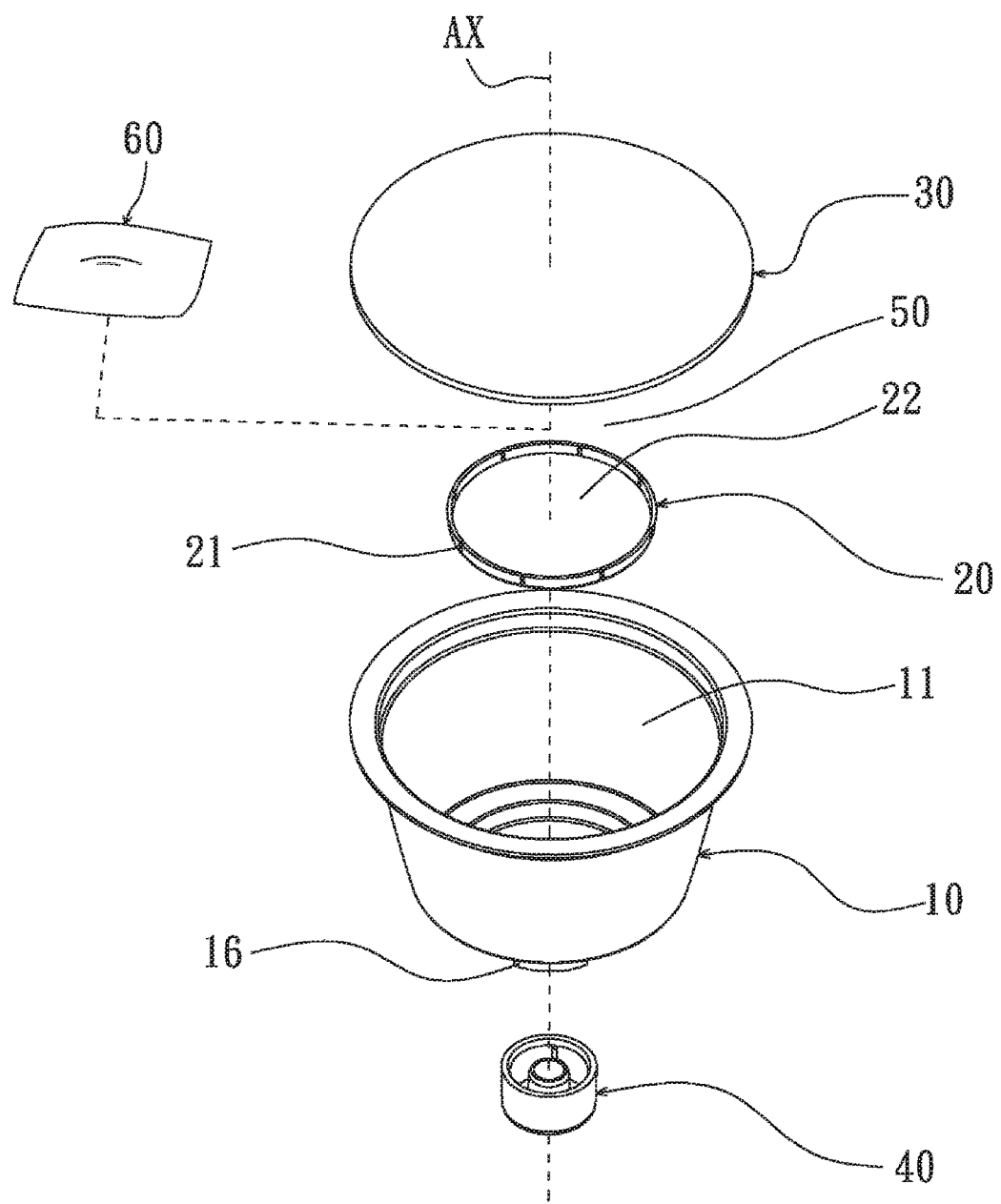
FIG. 2A is a downward view of an explosion drawing showing the beverage filtering cartridge of the present invention.
Figure 2B:
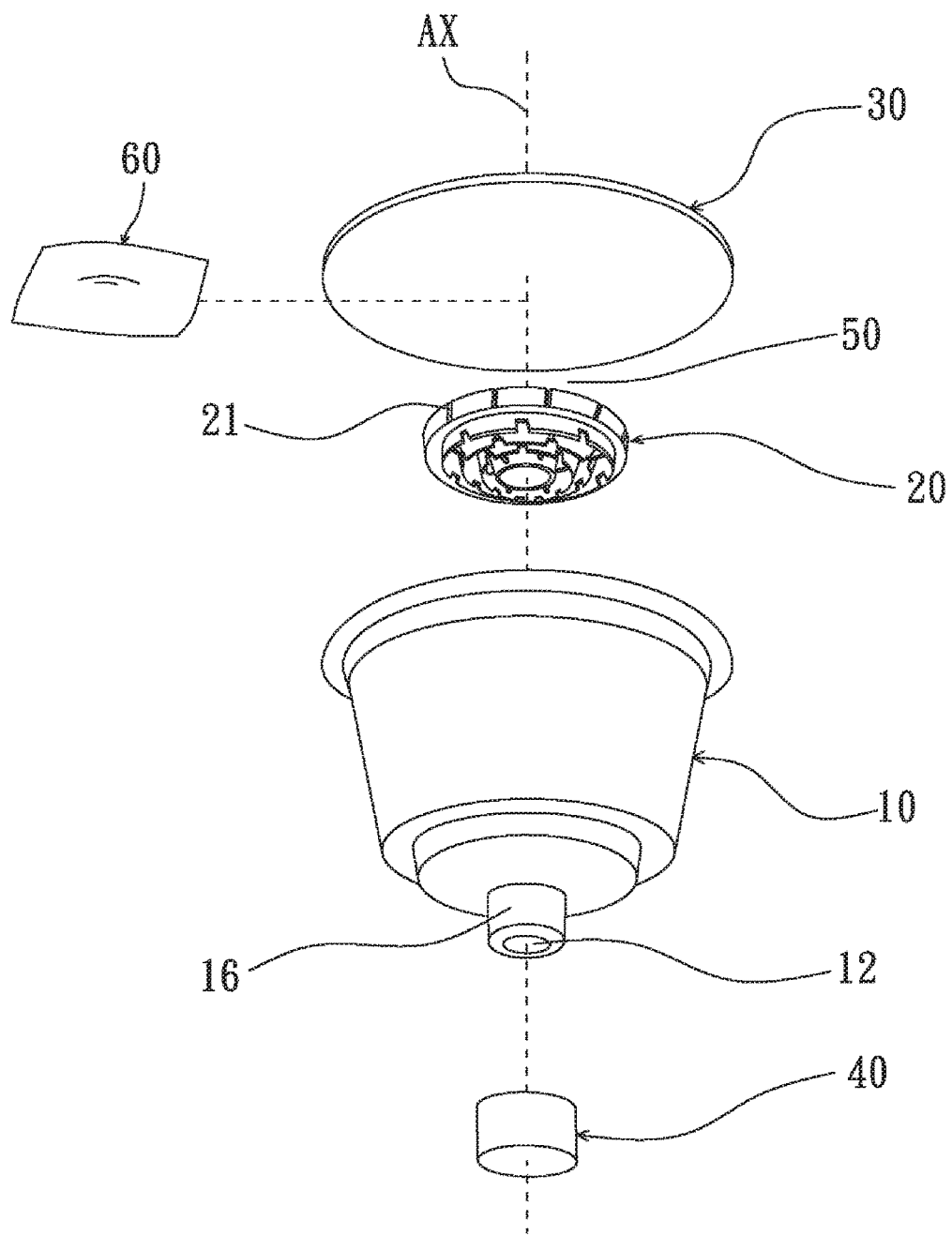
FIG. 2B is an upward view of an explosion drawing showing the beverage filtering cartridge of the present invention.

FIG. 2A is a downward view of an explosion drawing showing the beverage filtering cartridge of the present invention, and FIG. 2B is an upward view of an explosion drawing showing the beverage filtering cartridge of the present invention. As shown in FIGS. 2A and 2B, the cup-shaped body 10 includes a first opening 11 and a second opening 12, and the first opening 11 is larger than the second opening 12. An impermeable cover 30 irremovably covers the first opening 11, and a removable means 40 seals the second opening 12. A filtering element 20 is located in the cup-shaped body 10, and a space 50 is formed between the filtering element 20 and the impermeable cover 30 to contain a substance.

The center of first opening 11 and the center of second opening 12 define a first axis AX, and the second opening 12 has a side wall 16 which extends from the cup-shaped body 10 and surrounding the first axis AX so as to form a tunnel.

Figure 3A:
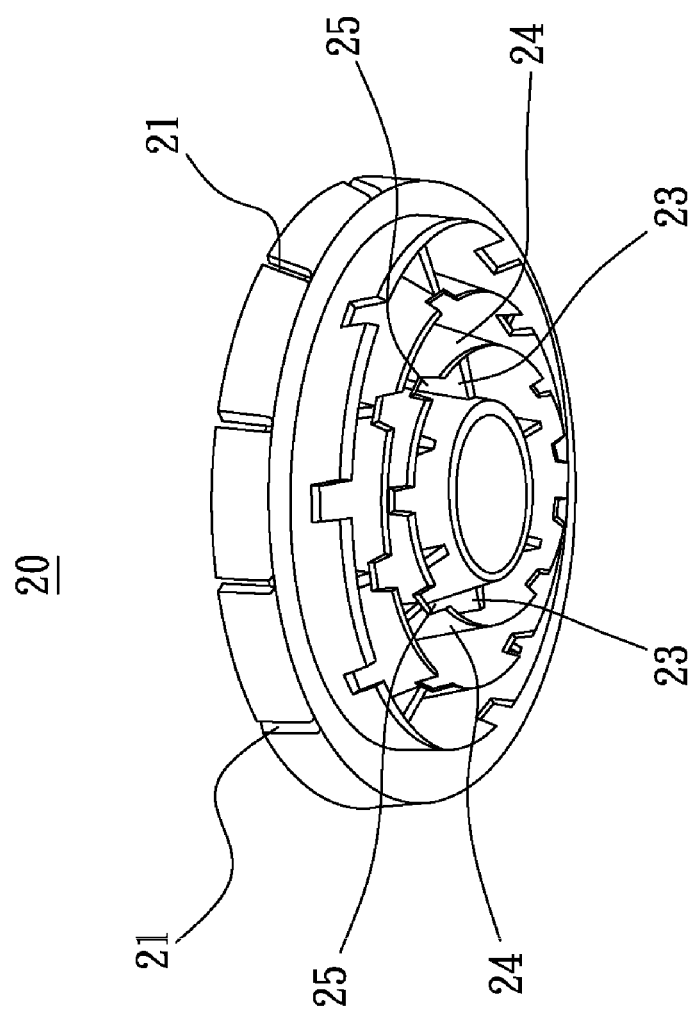
FIG. 3A is an upward view of the filtering element of the present invention.
Figure 3B:
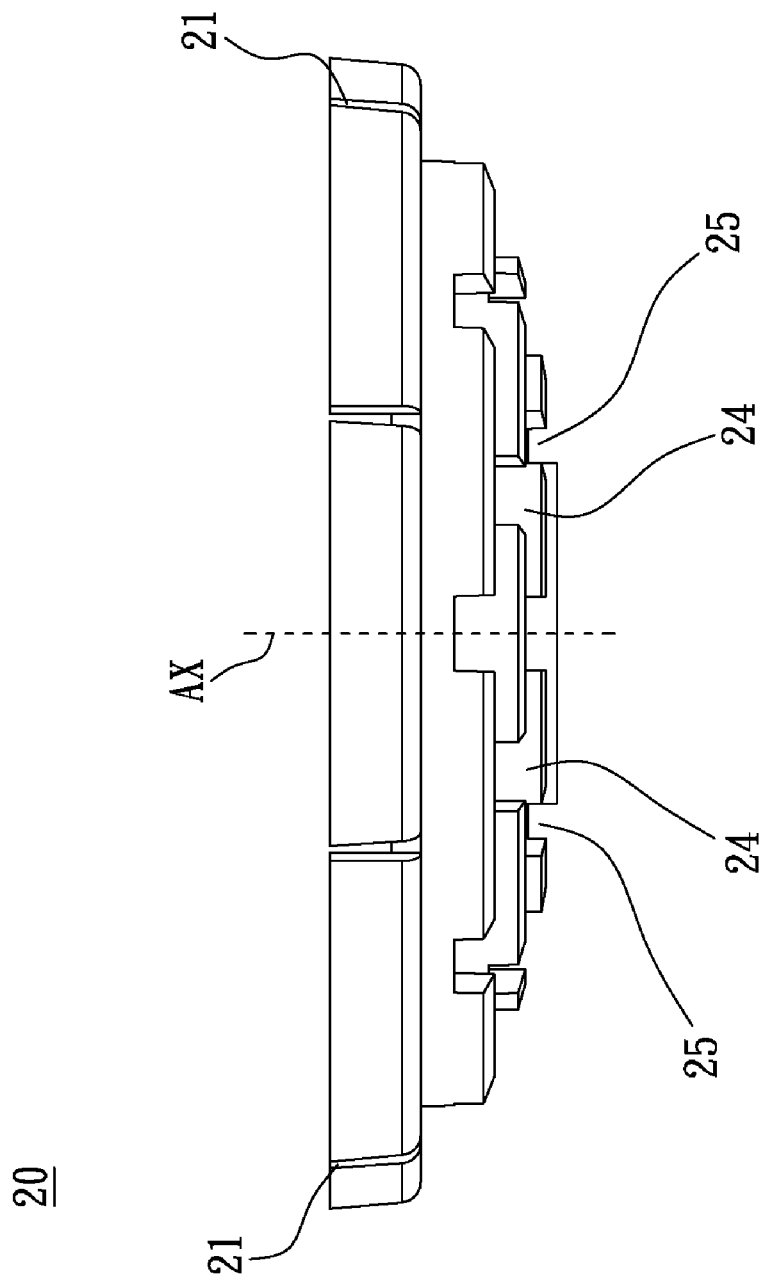
FIG. 3B is a downward view of the filtering element of the present invention.

FIG. 3A is an upward view of the filtering element of the present invention, and FIG. 3B is a downward view of the filtering element of the present invention. As shown in FIGS. 3A and 3B, the filtering element 20 has a plurality of holes 21. In the embodiment, the holes 21 are located on the periphery of the filtering element 20. Furthermore, a plurality of holes 21 could also be located in the plane 22 of the filtering element 20. In the embodiment of the invention, the filtering element 20 lodged in the cup-shaped body 10.

As shown in FIGS. 2A, 3A and 3B, the filtering element 20 has a plane 22 perpendicular to first axis AX and a first protruding wall 23 parallel with first axis AX and protruding from the plane 22 toward the second opening 12. First protruding wall 23 is coplanar with first axis AX and perpendicular to the plane 22 of the filtering element 20. In addition, the filtering element 20 has second protruding wall 24 encircling first axis AX and protruding from the plane 22 toward the second opening 12. The second protruding wall 24 further has at least one indentation 25.

Figure 4A:
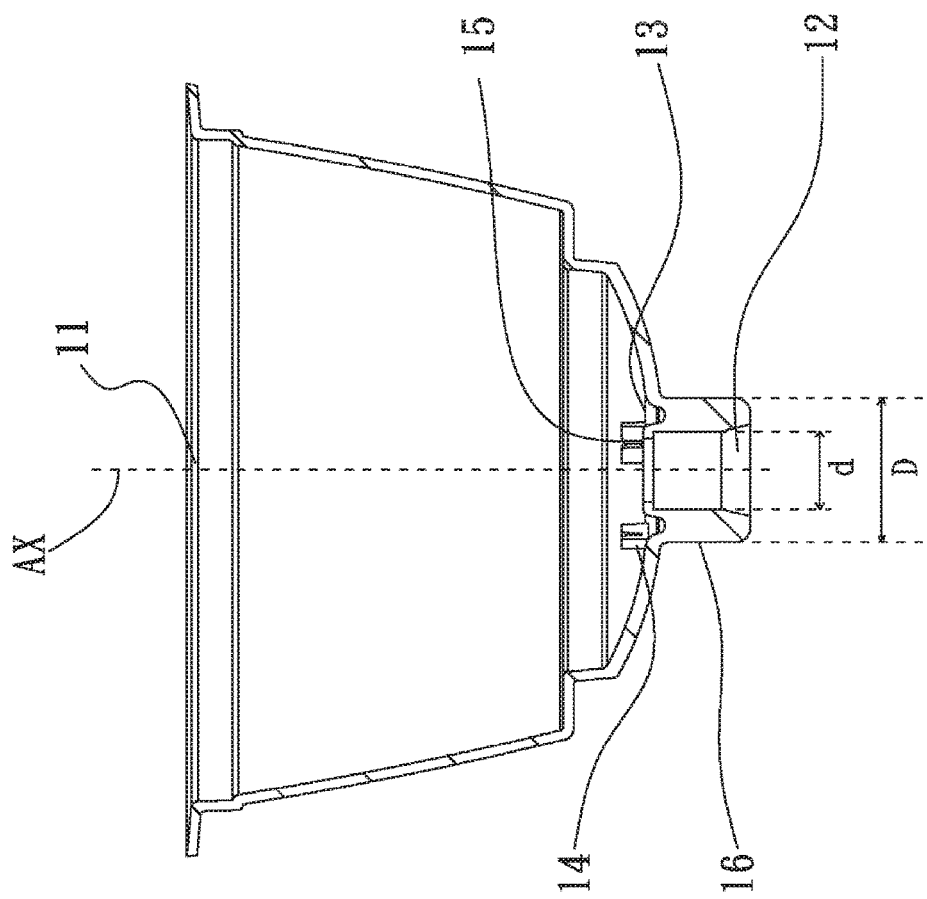
FIG. 4A is a cross-sectional view of the cup-shaped body of the present invention.
Figure 4B:
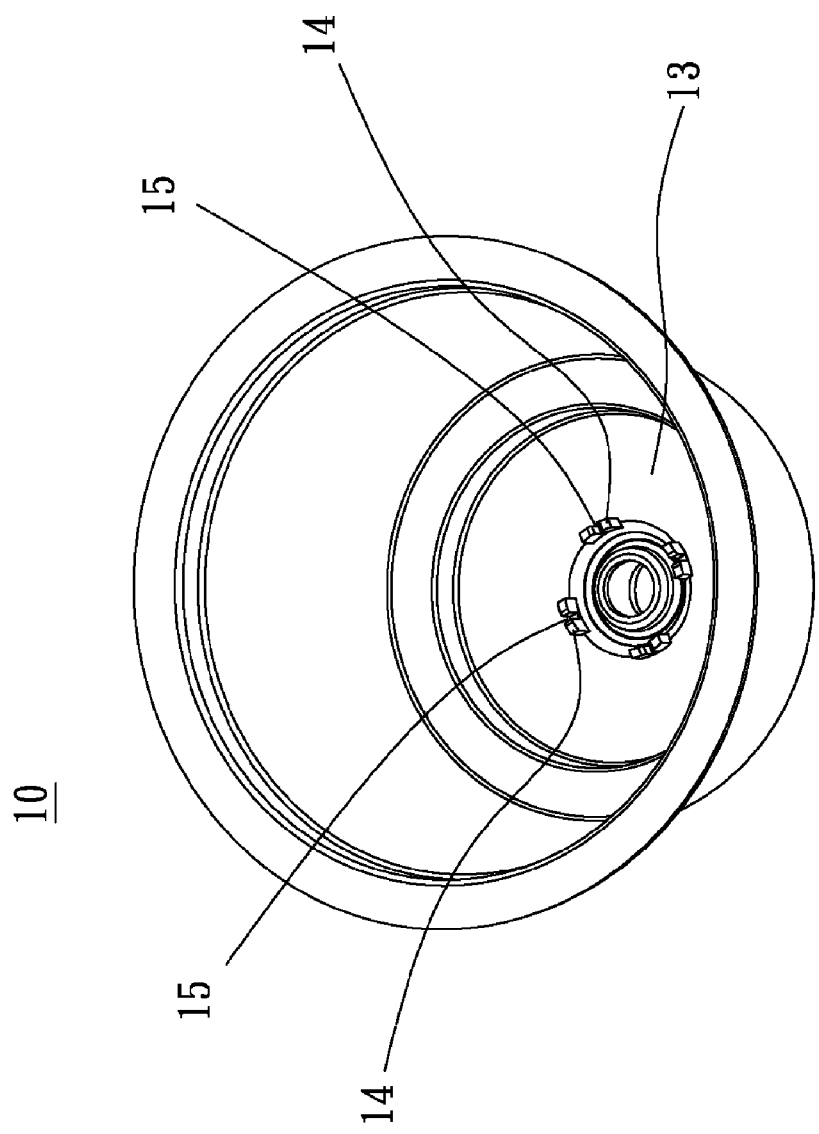
FIG. 4B is a downward view of the cup-shaped body of the present invention.

FIG. 4A is a cross-sectional view of the cup-shaped body of the present invention, and FIG. 4B is a downward view of the cup-shaped body of the present invention. As shown in FIGS. 4A and 4B, the cup-shaped body 10 has a bottom surface 13 close to the second opening 12 and a third protruding wall 14 parallel with first axis AX and protruding from the bottom surface 13 toward the first opening 11. The third protruding wall 14 has a slit 15. The first protruding wall 23 and the third protruding wall 14 are nonparallel and crisscross. When the filtering element 20 is combined with the cup-shaped body 10, the first protruding wall 23 is inserted into the slit 15 of third protruding wall 14. In the present invention, the slit 15 could be formed in the first protruding wall 23 in lieu of the second protruding wall 24, so the filtering element 20 is combined with the cup-shaped body 10 by inserting the third protruding wall 14 into the slit. In addition, the width of the slit 15 is substantially equal to the thickness of corresponding protruding wall.

Figure 5:
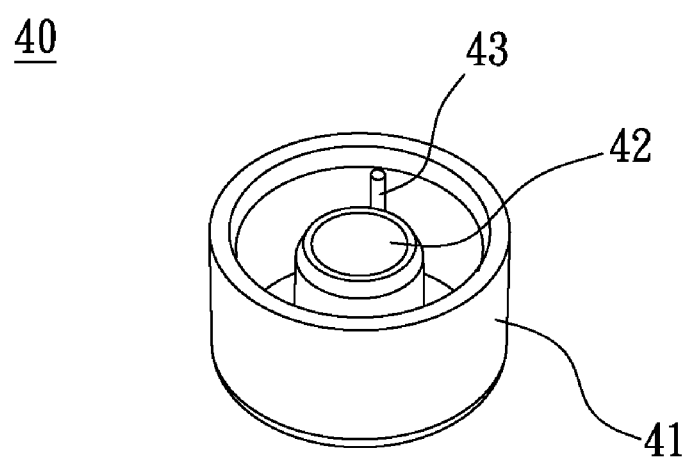
FIG. 5 is a downward view of the removable means of the beverage filtering cartridge.

FIG. 5 is a downward view of the removable means of the beverage filtering cartridge. As shown in FIG. 5, the removable means 40 includes a cup-shaped housing 41 and a pillar 42 locating in the cup-shaped housing 41. Thus, the removable means 40 looks like a plug. The removable means 40 may further include a plurality of ribs 43, and the ribs 43 are formed on the inside wall of cup-shaped housing 41 with equal circumferential angle. As shown in FIGS. 4A and 5, the diameter of the inside wall of the cup-shaped housing 41 is substantially equal to the exterior diameter D of outside wall 16 of the second opening. Furthermore, the pillar 42 is located in the cup-shaped housing 41, and the diameter of outside wall of the pillar 42 is substantially equal to the diameter d of inside wall 16 of the second opening. Thus, when the removable means 40 blocks the second opening 12, cup-shaped housing 41 substantially functions as a cover covering and sealing the second opening 12. Furthermore, when the removable means 40 covers and seals the second opening 12, the ribs 43 force the removable means 40 to tightly block and seal the second opening 12 of the cup-shaped body 10.

As shown in FIG. 2A, a bag 60 contains the substance (not shown), such as coffee, and the bag 60 is soft and located in the space 50 of the cup-shaped body 10 formed between the filtering element 20 and the impermeable cover 30. In the present invention, the space 50 could be directly filled with the substance without the bag 60. In addition, the bag 60 is made of penetrable material that the liquid could flow in and out, such as filter paper, cotton, polymer . . . etc.

When the user uses the beverage filtering cartridge 100 with a brewer system, the removable means 40 will be removed from the second opening 12. The brewer system injects the water into the space 50 with a tiny conduit, and then the water dissolves or reduces the substance inside the cartridge to a drink. The drink further flows through the holes 21 in the filtering element 20. The drink goes through the indentation 25 of the second protruding wall 24, and finally, the drink flows out of the cup-shaped body 10 through the second opening 12.

Moreover, the beverage filtering cartridge 100 could be packaged in a plastic bag so as to tightly seal it. For example, after the impermeable cover 30 seals the first opening 11 of the cup-shaped body 10 and the removable means 40 blocks the second opening 12, the beverage filtering cartridge 100 is packaged and sealed in a plastic bag that is filled up with Nitrogen gas. It will provide a dry environment inside the plastic bag.

The removable means shown in FIG. 5 is a preferable example. The removable means could only be a pillar 42 or a cup-shaped housing 41. By using either a pillar 42 or a cup-shaped housing 41, it will block, cover or seal the second opening 12 of the cup-shaped body 10 and achieve the sealed function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention have been described in detail, it should be understood that the various changes, substitutions, and alterations could be made hereto without departing from the spirit and scope of the invention.

What is claimed is:

1. A beverage filtering cartridge for storing a substance which can be reduced or dissolved to a drink, comprising:
   a cup-shaped body, comprising a first opening port and a second opening port disposed opposite to the first opening port;
   an impermeable cover, covering the first opening port and contacting the cup-shaped body directly;
   a removable means, covering the second opening port; and
   a filtering element, comprising at least one mesh and lodging in the cup-shaped body so that a space for storing the substance is between the impermeable cover and the filtering element;
   wherein a center of the first opening port and a center of the second opening port define a first axis, and the second opening port comprises a side wall which extends from the cup-shaped body and surrounds the first axis so as to form a tunnel;
   wherein the filtering element further comprises a plane parallel to the impermeable cover, and a first protruding wall perpendicular to said plane and protruding from said plane toward the second opening port;
   wherein the cup-shaped body further comprises a bottom surface close to the second opening port, and a third protruding wall protruding from the bottom surface toward the first opening port so that the first protruding wall and the third protruding wall are nonparallel and crisscross;

wherein the third protruding wall further comprises a slit so that the first protruding wall is inserted into the slit of the third protruding wall.

2. The beverage filtering cartridge of claim 1 wherein the removable means comprises a cup-shaped housing and a pillar locating in the cup-shaped housing.

3. The beverage filtering cartridge of claim 2 wherein the removable means further comprises a plurality of ribs and the ribs are formed on an inside wall of the cup-shaped housing with one another being an equal circumferential angle.

4. The beverage filtering cartridge of claim 1 wherein the removable means is a pillar.

5. The beverage filtering cartridge of claim 1 wherein the removable means is a cup-shaped housing.

6. A beverage filtering cartridge for storing a substance which can be reduced or dissolved to a drink, comprising:
   a cup-shaped body, comprising a first opening port and a second opening port disposed opposite to the first opening port;
   an impermeable cover, covering the first opening port and contacting the cup-shaped body directly;
   a removable means, covering the second opening port; and
   a filtering element, comprising at least one mesh and lodging in the cup-shaped body so that a space for storing the substance is between the impermeable cover and the filtering element;
   wherein a center of the first opening port and a center of the second opening port define a first axis, and the second opening port comprises a side wall which extends from the cup-shaped body and surrounds the first axis so as to form a tunnel;
   wherein the filtering element further comprises a plane parallel to the impermeable cover, and a first protruding wall perpendicular to said plane and protruding from said plane toward the second opening port;
   wherein the cup-shaped body further comprises a bottom surface close to the second opening port, and a third protruding wall protruding from the bottom surface toward the first opening port so that the first protruding wall and the third protruding wall are nonparallel and crisscross;
   wherein the first protruding wall further comprises a slit so that the third protruding wall is inserted into the slit of the first protruding wall.

* * * * *